US009280877B2

(12) United States Patent
Visser

(10) Patent No.: US 9,280,877 B2
(45) **Date of Patent: *Mar. 8, 2016**

(54) METHOD OF GAMING, A GAME CONTROLLER AND A GAMING SYSTEM

(71) Applicant: Aristocrat Technologies Australia Pty Limited, North Ryde, NSW (AU)

(72) Inventor: Antoon Christiaan Visser, Coogee (AU)

(73) Assignee: ARISTOCRAT TECHNOLOGIES AUSTRALIA PTY LIMITED (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/098,092

(22) Filed: Dec. 5, 2013

(65) Prior Publication Data

US 2014/0094261 A1 Apr. 3, 2014

Related U.S. Application Data

(63) Continuation of application No. 12/465,948, filed on May 14, 2009, now Pat. No. 8,602,886.

(30) Foreign Application Priority Data

May 23, 2008 (AU) ................................ 2008902586

(51) Int. Cl.
*G07F 17/34* (2006.01)
*A63F 13/10* (2006.01)
*G07F 17/32* (2006.01)

(52) U.S. Cl.
CPC ................ *G07F 17/34* (2013.01); *G07F 17/32* (2013.01); *G07F 17/3267* (2013.01)

(58) Field of Classification Search
CPC ..... G07F 17/32; G07F 17/34; G07F 17/3267; G07F 17/3211; A63F 13/10
USPC ................................................ 463/20, 30, 31
See application file for complete search history.

(56) References Cited

U.S. PATENT DOCUMENTS

| | | | |
|---|---|---|---|
| 6,652,378 B2 | 11/2003 | Cannon et al. | |
| 7,338,372 B2 | 3/2008 | Morrow et al. | |
| 7,901,294 B2 | 3/2011 | Walker et al. | |
| 8,109,821 B2 | 2/2012 | Kovacs et al. | |
| 2002/0002078 A1 | 1/2002 | Jaffe | |
| 2003/0069064 A1 | 4/2003 | Ainsworth | |
| 2003/0151562 A1 | 8/2003 | Kulas | |
| 2005/0043088 A1 * | 2/2005 | Nguyen .................. | G07F 17/32 463/29 |
| 2005/0143168 A1 | 6/2005 | Torango | |
| 2005/0167908 A1 | 8/2005 | Nally et al. | |
| 2005/0233794 A1 | 10/2005 | Cannon | |
| 2006/0052152 A1 | 3/2006 | Tedsen et al. | |
| 2006/0287045 A1 | 12/2006 | Walker et al. | |
| 2007/0004513 A1 | 1/2007 | Wells et al. | |
| 2007/0010318 A1 | 1/2007 | Rigsby et al. | |
| 2007/0093290 A1 | 4/2007 | Winans et al. | |

(Continued)

FOREIGN PATENT DOCUMENTS

| | | |
|---|---|---|
| AU | 2002256429 B2 | 6/2007 |
| AU | 2007216701 A1 | 9/2007 |

(Continued)

*Primary Examiner* — Pierre E Elisca
(74) *Attorney, Agent, or Firm* — McAndrews Held & Malloy, Ltd.

(57) ABSTRACT

A method of gaming comprising: awarding a plurality of game rounds in response to occurrence of a trigger event; and conducting at least two of the plurality of game rounds concurrently in separate display areas.

17 Claims, 7 Drawing Sheets

(56) References Cited

U.S. PATENT DOCUMENTS

| | | | | |
|---|---|---|---|---|
| 2007/0099688 | A1 | 5/2007 | Brosnan et al. | |
| 2007/0111787 | A1 | 5/2007 | Adams et al. | |
| 2008/0020841 | A1 | 1/2008 | Wells et al. | |
| 2008/0076532 | A1 * | 3/2008 | Graham | G07F 17/32 463/25 |
| 2009/0075713 | A1 | 3/2009 | Hartman et al. | |
| 2009/0111574 | A1 * | 4/2009 | Rowe | G07F 17/32 463/25 |
| 2012/0270640 | A1 * | 10/2012 | Baerlocher | G07F 17/3255 463/25 |
| 2013/0337903 | A1 * | 12/2013 | Schaefer | G06F 17/00 463/27 |

FOREIGN PATENT DOCUMENTS

| | | | |
|---|---|---|---|
| CA | 1232093 | A1 | 1/1988 |
| DE | 102005058074 | A1 | 6/2007 |
| GB | 2437790 | A | 11/2007 |
| GB | 2440272 | A | 1/2008 |
| JP | 2006212284 | A | 8/2006 |
| JP | 200631898 | A | 11/2006 |
| JP | 2007011243 | A | 1/2007 |
| RU | 2220754 | C1 | 1/2004 |
| WO | 2004063860 | A2 | 7/2004 |
| WO | 2005025695 | A2 | 3/2005 |
| WO | 2008028153 | A2 | 3/2008 |

* cited by examiner

METHOD OF GAMING, A GAME CONTROLLER AND A GAMING SYSTEM

RELATED APPLICATIONS

This application is a continuation of co-pending U.S. patent application Ser. No. 12/465,948, filed May 14, 2009, which claims priority to Australia Provisional Patent Application No. 2008902586 having a filing date of May 23, 2008. The above-identified applications are hereby incorporated herein by reference in their entirety.

FIELD OF INVENTION

The invention relates to a method of gaming, a game controller and a gaming system.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Gaming systems are known where a player plays a base game and if a trigger event occurs a feature game is awarded to the player.

While such gaming systems provide users with enjoyment, a need exists for alternative gaming systems in order to maintain or increase player enjoyment.

BRIEF SUMMARY OF THE INVENTION

In a first aspect, the invention provides a method of gaming comprising:

awarding a plurality of game rounds in response to occurrence of a trigger event; and conducting at least two of the plurality of game rounds concurrently in separate display areas.

In an embodiment, the method comprises providing the separate display areas on separate displays.

In an embodiment, there are two display areas.

In an embodiment, each awarded game round is of the same game.

In an embodiment, the method comprises dividing the plurality of game rounds between the display areas.

In an embodiment, the at least two game rounds are of different feature games.

In an embodiment, the method comprises determining at least one combined outcome based on the outcomes of the different feature games.

In an embodiment, at least one of the game rounds is conducted by selecting a plurality of symbols from a set of symbols for display at a plurality of display positions and determining a game round outcome at least partly based on the displayed symbols.

In an embodiment, the set of symbols corresponds to a plurality of spinnable reels.

In a second aspect, the invention provides a game controller for a gaming system, the game controller arranged to:

award a plurality of game rounds in response to occurrence of a trigger event; and conduct at least two of the plurality of game rounds concurrently in separate display areas.

In an embodiment, the game controller comprises a concurrent display module adapted to control one or more displays to display the at least two game rounds in separate display areas.

In an embodiment, the concurrent display module is adapted to control two or more displays to display the at least two game rounds.

In an embodiment, the game controller is constituted at least in part by a processor executing program code stored in a memory.

In an embodiment, there are two display areas.

In an embodiment, each awarded game round is of the same game.

In an embodiment, the game controller is arranged to divide the plurality of game rounds between the display areas.

In an embodiment, the at least two game rounds are of different feature games.

In an embodiment, the game controller is arranged to determine at least one combined outcome based on the outcomes of the different feature games.

In an embodiment, the game controller is arranged to conduct at least one of the game rounds by selecting a plurality of symbols from a set of symbols for display at a plurality of display positions and determining a game round outcome at least partly based on the displayed symbols.

In an embodiment, the set of symbols corresponds to a plurality of spinnable reels.

In a third aspect, the invention provides a gaming system comprising:

at least one display; and a game controller, the game controller arranged to:

award a plurality of game rounds in response to occurrence of a trigger event; and conduct at least two of the plurality of game rounds concurrently in separate display areas.

In an embodiment, the gaming system comprises two or more displays and the at least two separate display areas are on different displays.

In an embodiment, the at least one display forms part of a player interface which further comprises a game play mechanism operable by the player to play a game.

In an embodiment, the gaming system comprises a concurrent display module adapted to control the at least one display.

In an embodiment, the concurrent display module is adapted to control two or more displays to display the at least two game rounds.

In an embodiment, the game controller comprises a processor executing program code stored in a memory.

In an embodiment, each awarded game round is of the same game.

In an embodiment, the game controller is arranged to divide the plurality of game rounds between the display areas.

In an embodiment, the at least two game rounds are of different feature games.

In an embodiment, the game controller is arranged to determine at least one combined outcome based on the outcomes of the different feature games.

In an embodiment, at least one of the game rounds is conducted by the game controller selecting a plurality of symbols from a set of symbols for display at a plurality of display positions and determining a game round outcome at least partly based on the displayed symbols.

In an embodiment, the set of symbols corresponds to a plurality of spinnable reels.

In a fourth aspect, the invention provides a gaming system comprising:

at least two display areas on at least one display;

means for awarding a plurality of game rounds in response to occurrence of a trigger event; and means for conducting at least two of the plurality of game rounds concurrently in separate display areas.

In a fifth aspect, the invention provides a gaming machine comprising:

at least one display mounted within a cabinet;

an input device mounted to the cabinet for initiating play of a game;

a game controller in data communication with the at least one display and the input device and comprising a processor and a memory storing game program code executed in response to operation of the input device to initiate play, such that the game controller awards a plurality of game rounds in response to occurrence of a trigger event, and conducts at least two of the plurality of game rounds concurrently in separate display areas of the at least one display.

In a sixth aspect, the invention provides computer program code which when executed implements the above method.

In a seventh aspect, the invention provides a computer readable medium comprising the above program code.

In an eighth aspect, the invention provides a data signal comprising the above program code.

In a ninth aspect, the invention provides transmitting and receiving the above data signal.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
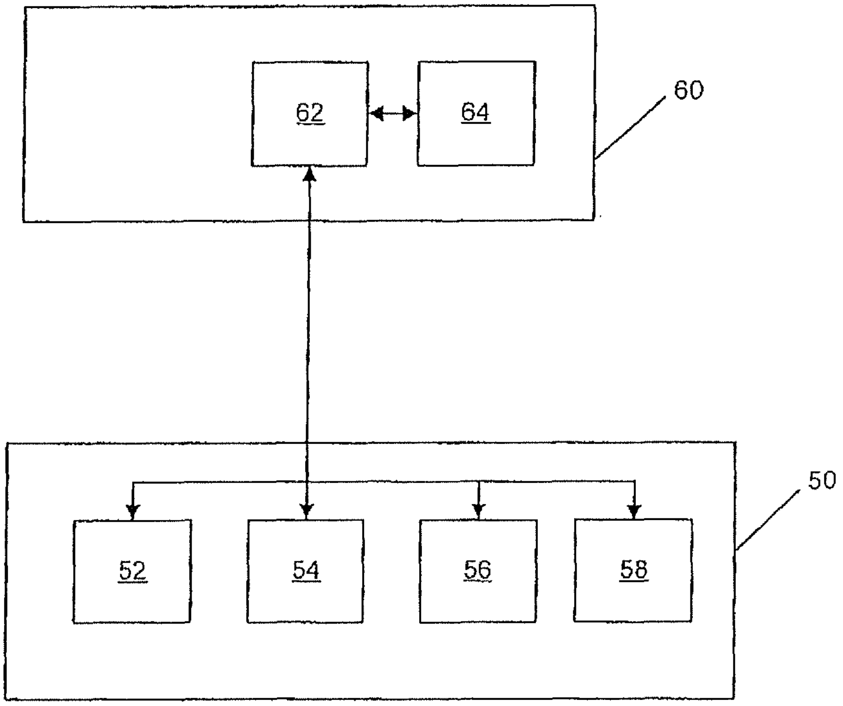
FIG. 1 is a block diagram of the core components of a gaming system.

Referring to the drawings, there is shown a gaming system having a game controller arranged to implement a where when a trigger event occurs, a plurality of game rounds are awarded and at least two of the awarded game rounds are carried out in separate display areas.

General Construction of Gaming System

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system comprises several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54, a game play mechanism 56 comprising one or more input devices that enable a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
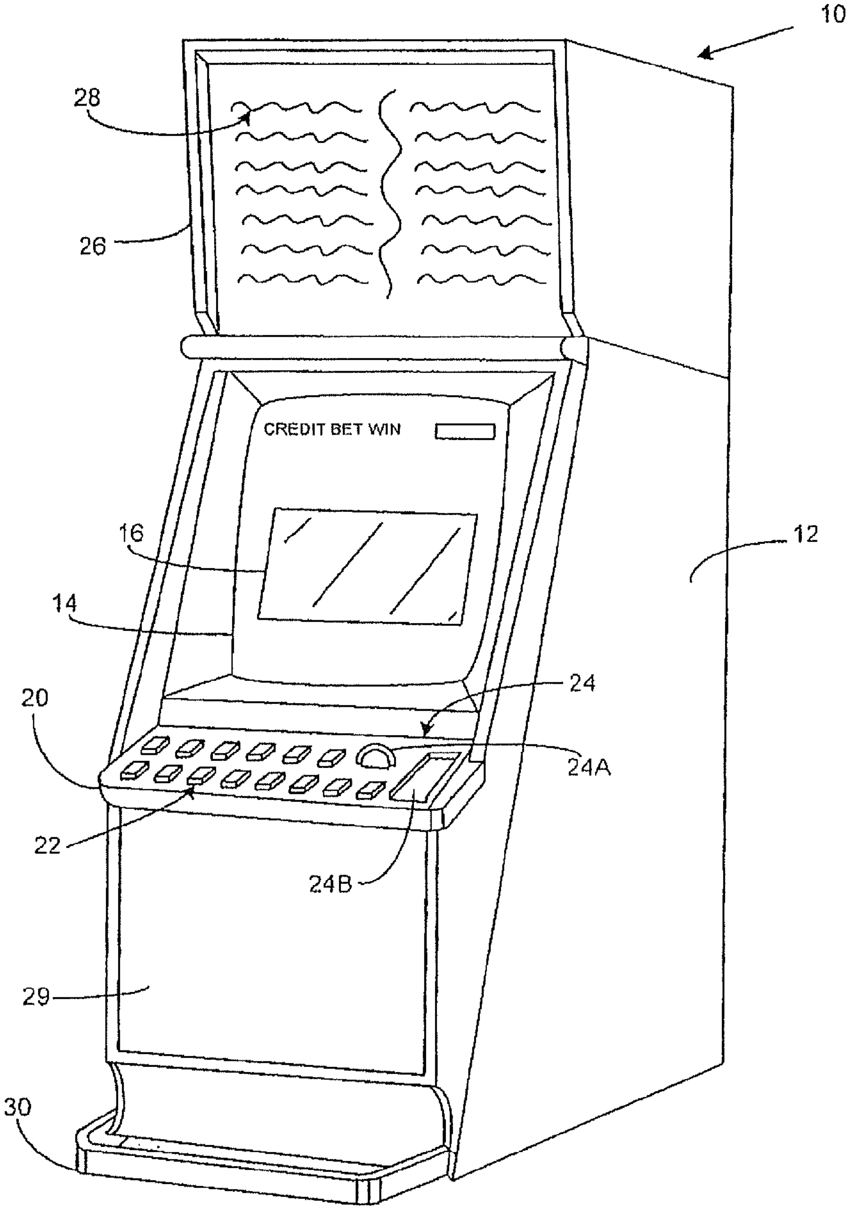
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device.

Alternatively, the display 14 may be a liquid crystal display, plasma screen, any other suitable video display unit, and in some embodiments may be the visible portion of an electromechanical device. The top box 26 may also include a display, for example a video display unit, which may be of the same type as the display 14, or of a different type.

Figure 3:
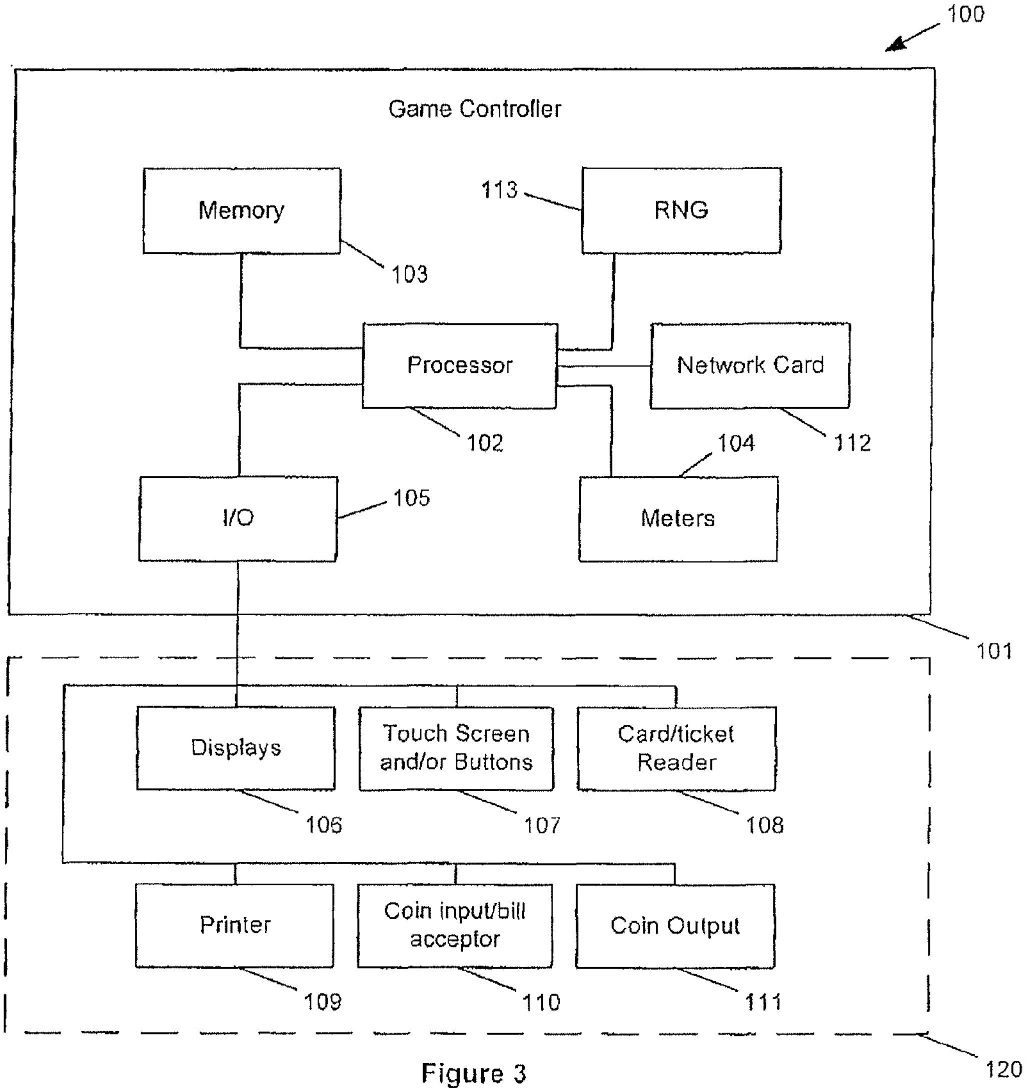
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 comprise one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game.

In addition, the gaming machine 100 may include a communications interface, for example a network card 112. The network card may, for example, send status information, accounting information or other information to a central controller, server or database and receive data or commands from the central controller, server or database.

Figure 4:
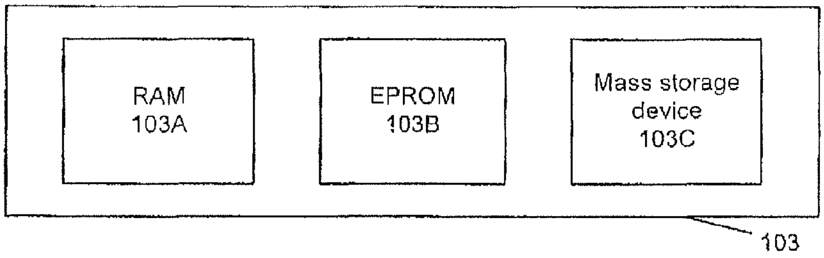
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
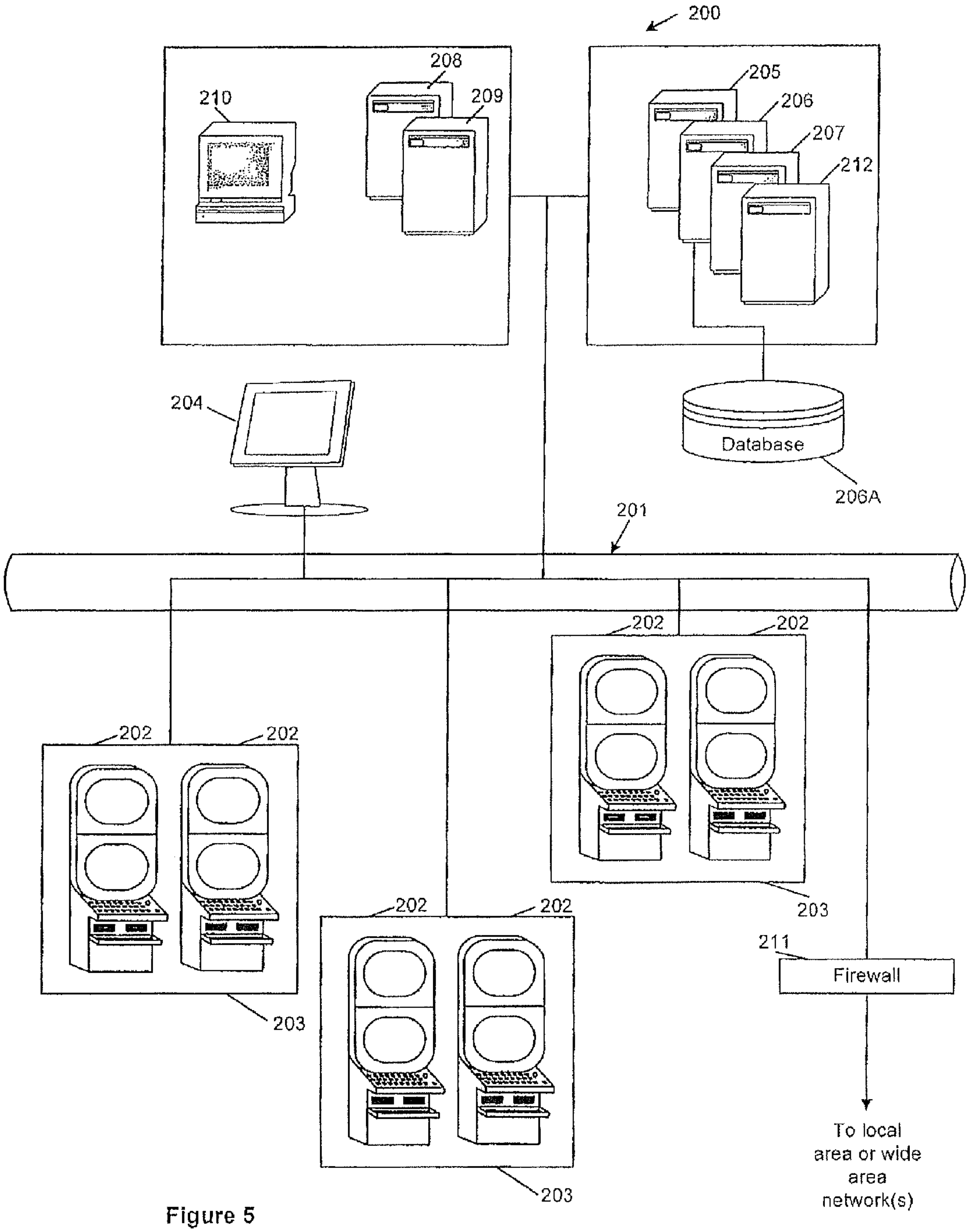
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

The player operates the game play mechanism 56 to specify the win entitlement which will be evaluated for this play of the game and initiates a play of the game. Persons skilled in the art will appreciate that a player's win entitlement will vary from game to game dependent on player selections. In most spinning reel games, it is typical for the player's entitlement to be affected by the amount they wager and selections they make (i.e. the nature of the wager). For example, a player's win entitlement may be based on how many lines they will play in each game—i.e. a minimum of one line up to the maximum number of lines allowed by the game (noting that not all permutations of win lines may be available for selection. Such win lines are typically formed by a combination of displayed symbol positions, one from each reel, the symbol positions being located relative to one another such that they form a line.

In many games, the player's win entitlement is not strictly limited to the lines they have selected, for example, "scatter" pays are awarded independently of a players selection of pay lines and are an inherent part of the win entitlement.

Persons skilled in the art, will appreciate that in other embodiments, the player may obtain a win entitlement by selecting a number of reels to play. Such games are marketed under the trade name "Reel Power" by Aristocrat Leisure Industries Pty Ltd. The selection of the reel means that each symbol of the reel can be substituted for a symbol at one or more designated display positions. In other words, all symbol positions of a selected reel can be used to form symbol combinations with designated, displayed symbol positions of other reels.

In other embodiments a player win entitlement may be affected by purchasing access to particular pay tables—e.g. a first bet amount entitles the player to wins including cherries and a second amount entitles them to wins including plums.

Figure 6:
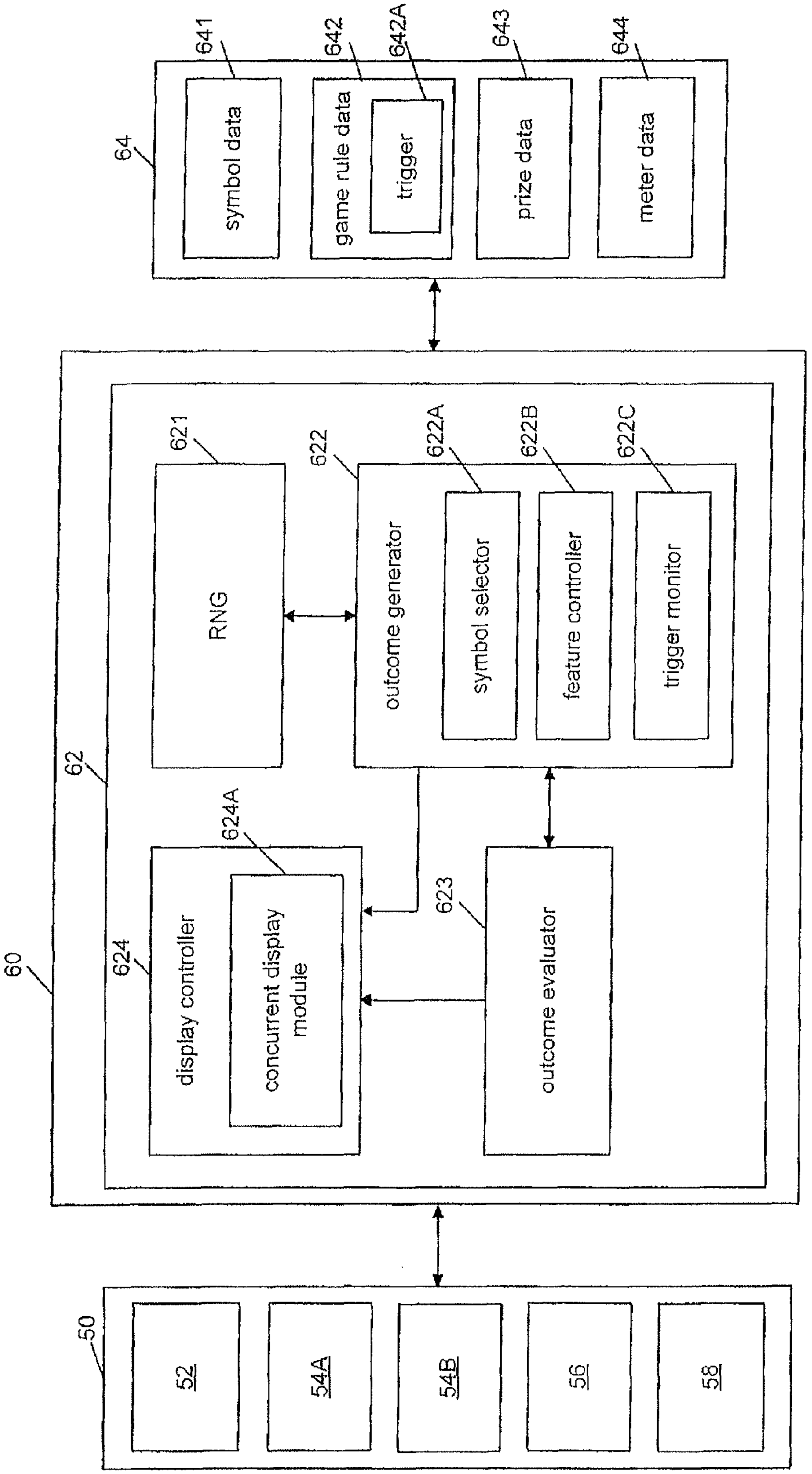
FIG. 6 is a further block diagram of a gaming system.

In FIG. 6, the processor 62 of game controller 60 is shown implementing a number of modules based on program code and data stored in memory 64. Persons skilled in the art will appreciate that various of the modules could be implemented in some other way, for example by a dedicated circuit.

These modules include outcome generator 622 which operates in response to the player's operation of game play mechanism 56 to initiate a play of the game and generates a game outcome which will then be evaluated by prize evaluator 623. The first part of forming the game outcome is for a symbol selector 622A to select symbols from a set of symbols specified by symbol data 641 using random number generator 621. The selected symbols are advised to the display controller 624 which causes them to be displayed on display 54A at a set of display positions. This display of the outcome and its evaluation constitutes a base game outcome.

One example of selecting symbols is for the symbol selector 622A to select symbols for display from a plurality of symbol sets corresponding to respective ones of a plurality of spinning reels. The symbol sets 641 can specify a sequence of symbols for each reel such that the symbol selector 622A can select a symbol by selecting a stopping position in the sequence. In one example, three symbols of each of five reels may be displayed such that symbols are displayed at fifteen display positions on display 54. It is known to bias the stopping positions to thereby control the odds of the game. Other techniques can be used to control the odds of particular outcomes occurring to thereby control the return to player of the game.

The game controller 60 of this embodiment is arranged to implement a feature game involving an award of a plurality of game rounds if a trigger condition is met during the base game. To this end, the outcome generator 622 incorporates a trigger monitor 622C which monitors the symbols selected by symbol selector 622A to determine whether they correspond to a trigger condition 642A. If they do not, the play of the game is over, if they do, the feature game is triggered, a plurality of game rounds are awarded and the plurality of game rounds are conducted under control of the feature controller 622B. In the embodiment of FIG. 6, feature game controller instructs symbol selector 622A to select a set of symbols for each of the plurality of game rounds specified by game rules 642. For example, for ten game rounds. In this embodiment, the symbols are selected in the same manner as in the base game and are evaluated in the same manner by the outcome evaluator 623 and the trigger monitor 622C so that they may re-trigger the feature. Persons skilled in the art will appreciate that other triggers known in the art may be employed, for example random triggers or turnover based triggers.

All of the outcomes and their evaluations are advised to the display controller 624. Concurrent display module 624A controls display of the outcomes on two displays 54A,54B so that the plurality of game outcomes are divided between the two display, such that at least two game round outcomes are displayed concurrently, advantageously at the normal size of display of a game round outcome. Persons skilled in the art will appreciate that in some games the display of an outcome may vary in length, for example, a win on a large number of pay lines will take longer to display than no win. Accordingly, when it is said that game round outcomes are displayed concurrently, it will be understood that it is not intended to imply that the game rounds are coterminous. In some embodiments, the concurrent display module 624A may be arranged to determine an optimized division of the game rounds such that the total display time for game rounds on each display is as close to coterminous as possible. In one embodiment, the concurrent display module 624A may be arranged to adjust the speed of display of each game outcome so they display at the same rate irrespective of the outcome or at the same total rate across two displays. It will also be appreciated that in some embodiments, for example where there are an odd number of game rounds awarded, the game rounds may be divided unevenly between the two displays. It will be appreciated that concurrent display module may employ other rules to divide the display of game round outcomes between displays, for example, to ensure winning outcomes are split evenly between the two displays.

Gaming systems conventionally employ two displays, but if more displays are provided, more than two games could be displayed concurrently. In other embodiments, the game round can be displayed in separate display areas of the one display.

Figure 7:
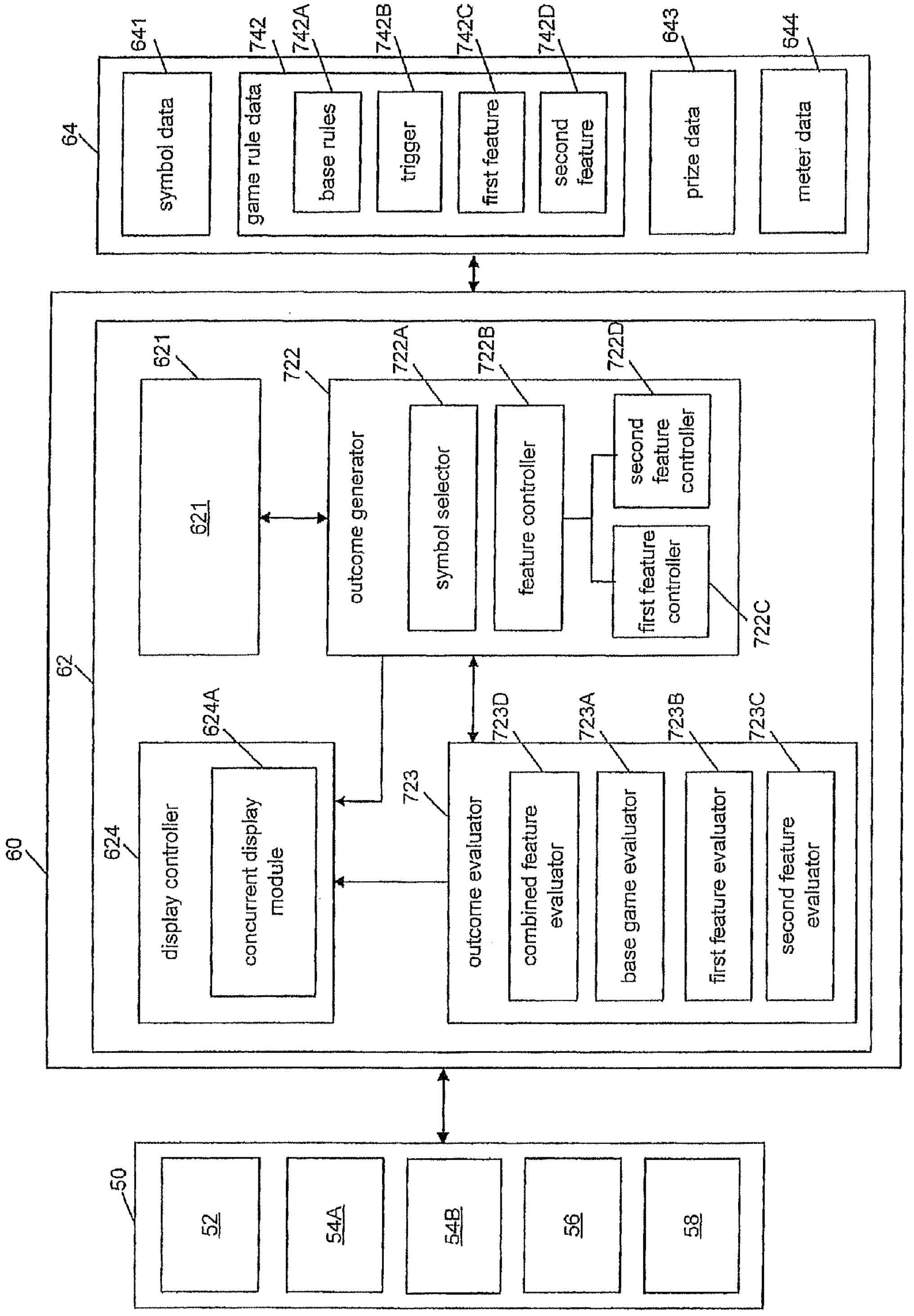
FIG. 7 is a block diagram of an alternative gaming system.

FIG. 7 shows an alternative embodiment of a gaming system, where the components operate essentially as described in relation to FIG. 6, the same number is used. In the embodiment of FIG. 7 a plurality of game rounds are awarded by awarding at least one game round of two feature games.

As shown in FIG. 7, the outcome generator 722 has a symbol selector 722A and a trigger monitor 722B which perform functions the same as described above based on symbol data 641 and trigger data 742B to implement the base game specified by base game rule data 742A, which is evaluated by base game evaluator 723A. When a trigger event occurs, two feature games are initiated under control of first feature controller 722C and second feature controller 722D. First feature data 742C and second feature data 724D specifies how the feature games are carried out. The feature games may be any known feature games, for example, one feature game may correspond to free game rounds of the base game while the other has totally different rules such as a so-called second screen game or be a modification of the base game, for example with a different pay table or added wild symbols etc. The feature games may have different numbers of game rounds. In another example, both features have different rules to the base game and are different to one another. The outcome evaluator 723 includes separate first feature evaluator 723B and second feature evaluator 723C modules. In the embodiment of FIG. 7, the outcome evaluator 723 includes a combined feature evaluator 723D arranged to determine whether to make an additional award based on the combined outcome of the two feature games. For example, the feature evaluator may multiply the total prize or award an additional prize if it determines that the total prizes awarded by the two feature games satisfy one or more rules such as being within a designated range.

Figure 8:
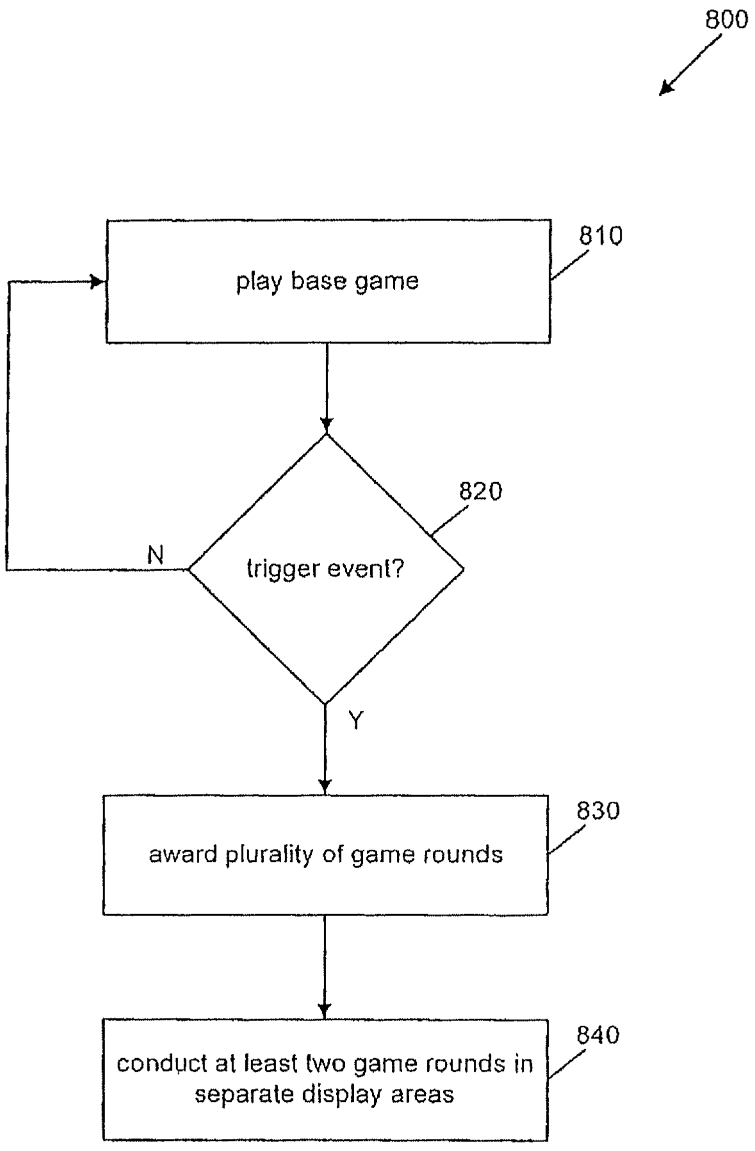
FIG. 8 is a flow chart of an embodiment.

The method 800 of an embodiment is summarized in FIG. 8 and involves playing a base game 810 until it is determined 820 that a trigger event has occurred. When the trigger occurs, a plurality of game rounds are awarded 830. At least two game rounds are conducted 840 in separate display areas.

Persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by downloading it from a server).

An advantage of some embodiments of the invention is that multiple game rounds can be carried out concurrently allowing more game rounds to be displayed in a defined period of time. This can either shorten the time required to display the awarded games or allow more games to be awarded. An advantage of some embodiments of the invention is that multiple feature games can be played concurrently. An advantage of some embodiments of the invention is that a combined outcome can be determined from multiple feature games.

It will be understood to persons skilled in the art of the invention that many modifications may be made without departing from the spirit and scope of the invention, in particular it will be apparent that certain features of embodiments of the invention can be combined to form further embodiments.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word “comprise” or variations such as “comprises” or “comprising” is used in an inclusive sense, i.e. to specify the presence of the stated features but not to preclude the presence or addition of further features in various embodiments of the invention.

The invention claimed is:

1. A method of gaming a) on a gaming machine having a non-transitory memory storing symbol data indicative of a plurality of symbol images, a game controller, and a display device operable to display at least one of said symbol images at a speed, and b) for playing a first game round having a first outcome based on at least one of said plurality of symbol images and a second game round having a second outcome based on at least one of said plurality of symbol images, the method comprising:

conducting the first game round including selecting via the game controller for display at least one of said first plurality of symbol images for said first outcome and the second game round including selecting via the game controller for display at least one of said second plurality of symbol images for said second outcome concurrently on the display device;

determining via the game controller a first length of play time for the first game round to reach said first outcome;

determining via the game controller a second length of play time for the second game round to reach said second outcome;

comparing via the game controller said first and said second length of play time;

in response to the comparison, increasing the speed of said display of 1) at least one of said first plurality of symbol images for said first outcome when said first length of play time is longer than said second length of play time, and 2) at least one of said second plurality of symbol images for said second outcome when said second length of play time is longer than said first length of play time; and terminating via the game controller both said first game round and said second game round, inclusive of the display of respective first outcome and second outcome, substantially coterminously.

2. A method as claimed in claim 1, and wherein the display device includes a plurality of display areas, the method further comprising displaying said first game round and said second game round in different display areas.

3. A method as claimed in claim 1, and wherein said first game round and said second game round are of the same game.

4. A method as claimed in claim 3, and wherein said display device comprises a plurality of display areas, and the method further comprising dividing said first game round and said second game round between the plurality of display areas.

5. A method as claimed in claim 1, and wherein said first game round and said second game round are of different games.

6. A method as claimed in claim 5, and further comprising determining at least one combined outcome based on outcomes of said different games.

7. A method as claimed in claim 1, and wherein said display device comprises a plurality of display positions, wherein selecting for display at least one of said plurality of symbol images further includes selecting for display at least one of said plurality of symbol images at at least one of said plurality of display positions, and determining at least one of said first outcome and said second outcome at least partly based on respective said at least one of said first plurality of symbol images and said at least one of said second plurality of symbol images.

8. A method as claimed in claim 1, and further comprising carrying said plurality of symbol images on one or more of a plurality of spinnable reels.

9. A game controller for a gaming system a) having a non-transitory memory storing symbol data indicative of a plurality of symbol images, and a display device operable to display at least one of said symbol images at a speed, and b) playing a first game round having a first outcome based on at least one of said plurality of symbol images and a second game round having a second outcome based on at least one of said plurality of symbol images, the game controller comprising:

an outcome generator configured to conduct the first game round including selecting for display at least one of said first plurality of symbol images for said first outcome and the second game round including selecting for display at least one of said second plurality of symbol images for said second outcome concurrently on the display device;

a feature controller configured to determine a first length of play time for the first game round to reach said first outcome, to determine a second length of play time for the second game round to reach said second outcome, and to compare said first length and said second length; and a concurrent display module, in response to said comparison, configured to increase the speed of said display of 1) at least one of said first plurality of symbol images for said first outcome when said first length of play time is longer than said second length of play time, and 2) at least one of said second plurality of symbol images for said second outcome when said second length of play time is longer than said first length of play time, and to terminate both said first game round and said second game round, inclusive of the display of respective first outcome and second outcome, substantially coterminously.

10. A game controller as claimed in claim 9, and wherein said display device comprises a plurality of display areas, and wherein said concurrent display module is further configured to control said plurality of display areas to display said first game round and said second game round in different display areas of said plurality of display areas.

11. A game controller as claimed in claim 9, and wherein said first game round and said second game round are of the same game.

12. A game controller as claimed in claim 11, and wherein said display device comprises a plurality of display areas, and wherein said concurrent display module is further configured to divide said first game round and said second game round between the plurality of display areas.

13. A game controller as claimed in claim 9, and wherein said first game round and said second game round are of different games.

14. A game controller as claimed in claim 13, and the game controller is further configured to determine at least one combined outcome based on outcomes of said different games.

15. A game controller as claimed in claim 9, and wherein said display device comprises a plurality of display positions, wherein the outcome generator is further configured to select for display at least one of said plurality of symbol images at at least one of said plurality of display positions and determining at least one of said first outcome and said second outcome at least partly based on respective said at least one of said first plurality of symbol images and said at least one of said second plurality of symbol images.

16. A game controller as claimed in claim 9, and wherein the gaming system further comprises a plurality of spinnable reels configured to carry said plurality of symbol images.

17. A gaming system comprising:

a non-transitory memory storing symbol data indicative of a plurality of symbol images;

at least one display device configured to display at least one of said symbol images at a speed; and a game controller configured to:

play a first game round having a first outcome based on at least one of said plurality of symbol images and a second game round having a second outcome based on at least one of said plurality of symbol images;

conduct the first game round including selecting for display at least one of said first plurality of symbol images for said first outcome and the second game round including selecting for display at least one of said second plurality of symbol images for said second outcome concurrently on the at least one display device;

determine a first length of play time for the first game round to reach said first outcome;

determine a second length of play time for the second game round to reach said second outcome;

compare said first length of play time and said second length of play time;

in response to said comparison, increase the speed of said display of 1) at least one of said first plurality of symbol images for said first outcome when said first length of play time is longer than said second length of play time, and 2) at least one of said second plurality of symbol images for said second outcome when said second length of play time is longer than said first length of play time; and terminate both said first game round and said second game round, inclusive of the display of respective first outcome and second outcome, substantially coterminously.

* * * * *